(12) United States Patent
DiVerdi et al.

(10) Patent No.: US 10,924,633 B1
(45) Date of Patent: Feb. 16, 2021

(54) RGB-BASED PARAMETRIC COLOR MIXING SYSTEM FOR DIGITAL PAINTING

(71) Applicant: Adobe Inc., San Jose, CA (US)

(72) Inventors: Stephen Joseph DiVerdi, Berkeley, CA (US); Sarah Garanganao Almeda, New Milford, NJ (US); Jose Ignacio Echevarria Vallespi, South San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/779,789

(22) Filed: Feb. 3, 2020

(51) Int. Cl.
| | | |
|---|---|---|
| *H04N 1/54* | (2006.01) | |
| *H04N 1/60* | (2006.01) | |
| *G01J 3/46* | (2006.01) | |

(52) U.S. Cl.
CPC .......... *H04N 1/54* (2013.01); *H04N 1/6008* (2013.01); *H04N 1/6011* (2013.01); *H04N 1/6016* (2013.01); *H04N 1/6033* (2013.01); *H04N 1/6038* (2013.01); *H04N 1/6097* (2013.01); *G01J 2003/467* (2013.01)

(58) Field of Classification Search
CPC .... H04N 1/56; H04N 1/58; H04N 1/60–6097; G06K 15/1878; G06K 15/188; G06T 7/90; G06T 11/001
See application file for complete search history.

(56) References Cited

U.S. PATENT DOCUMENTS

2014/0071124 A1 * 3/2014 Kawahara ............ G06T 15/503
345/419

OTHER PUBLICATIONS

Aisch, Gregor, "Mastering Multi-hued Color Scales with Chroma.js", downloaded from https://www.vis4.net/blog/2013/09/mastering-multi-hued-color-scales/ [retreived Jan. 3, 2020], 11 pages.

* cited by examiner

Primary Examiner — Scott A Rogers
(74) Attorney, Agent, or Firm — Finch & Maloney PLLC

(57) ABSTRACT

Techniques are disclosed for parametric color mixing in a digital painting application. A methodology implementing the techniques according to an embodiment includes generating a Bezier curve extending from a first point to a second point in a 3-Dimensional space. The first and second points are specified by coordinates based on red-green-blue (RGB) values of first and second mixing colors, respectively. The Bezier curve is defined by a selected curvature parameter which can be related to the paint medium, such as oil colors, water colors, pastels, etc., and which further specifies additive or subtractive mixing. The method also includes locating a point on the Bezier curve, the point determined by a selected mixing ratio parameter specifying a ratio of the first mixing color to the second mixing color. The method further includes generating a color mix based on RGB values specified by coordinates of the located point on the Bezier curve.

20 Claims, 9 Drawing Sheets
(4 of 9 Drawing Sheet(s) Filed in Color)

RGB-BASED PARAMETRIC COLOR MIXING SYSTEM FOR DIGITAL PAINTING

FIELD OF THE DISCLOSURE

This disclosure relates to digital painting. Particularly, this disclosure relates to techniques for mixing of colors in a digital painting application.

BACKGROUND

Color mixing is an important aspect of painting. In traditional painting, the artist physically mixes paint colors by applying them to a canvas with a brush. Digital painting tools attempt to provide color mixing functionality, but it is generally difficult to achieve realistic results. Many existing techniques either produce mixtures with a dull appearance that can appear artificial, or require complex processing and extensive computing resources, or require look up tables that consume relatively large quantities of memory and are specific for each paint medium.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

As noted previously, the ability to mix any two colors given to create a new color is an important aspect of painting, for both traditional (physical) painting and digital painting. Creating realistic color mixtures, including those that meet the artist's expectations based on his/her experience with physical painting mediums, is a challenging task for a digital painting application. Digital painting tools attempt to simulate natural media (e.g., oils, water colors, pastels, etc.) through combinations of red, green, and blue (RGB) lights, which may be presented as color palette choices on a display screen. These RGB colors are expected to behave as natural media pigments when mixed on a digital canvas. To this end, it would be desirable to have techniques that provide for digital mixing of colors that result in color mixes which conform to the artist's/user's expectations and/or a given color standard.

Thus, according to an embodiment of the present disclosure, a methodology is provided for the mixing of colors, for example in a digital painting tool or application, based on a relatively small number of selectable parameters. In some embodiments, the parameters are provided by a user and/or inferred from a given application. In some such cases, the parameters specify: (1) the nature of the paint medium (e.g., oils, water colors, pastels, etc.), each of which may have different mixing characteristics; (2) whether the mixing should be additive or subtractive; and (3) the ratio, or relative percentage, of the two paint colors being mixed. The color mixing process is modelled by a 3-Dimensional (3D) Bezier curve that traces a path in an RGB color space between two mixing colors. The curve extends from RGB coordinates of the first mixing color to RGB coordinates of the second mixing color. The first two of the parameters listed above are used to generate the Bezier curve, and the third parameter is used to pick a point along the curve that defines the mixed color, according to one such embodiment, and as will be explained in greater detail below.

Figure 1:
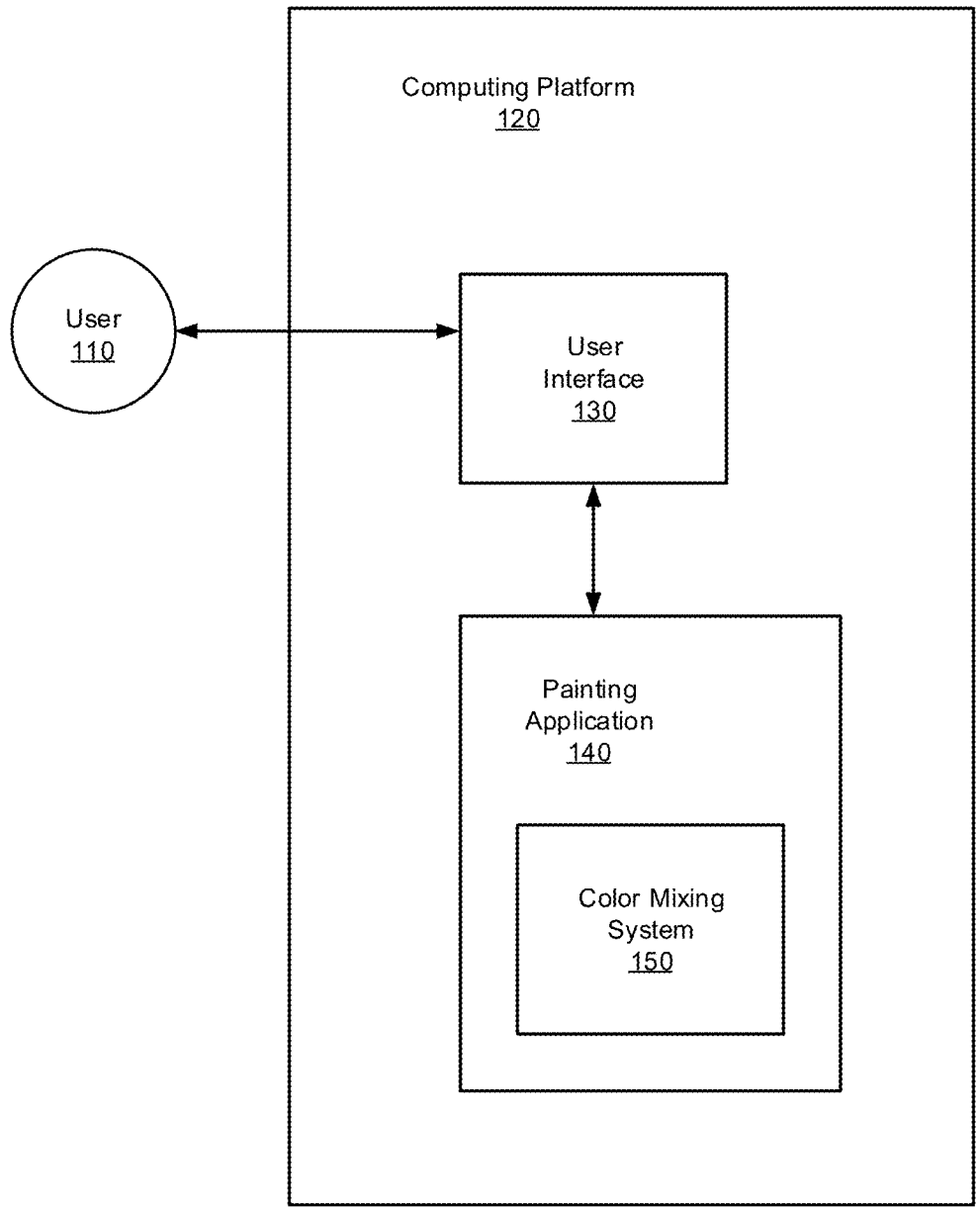
FIG. 1 provides a top-level view of a computing platform to execute a digital painting application with a color mixing system, configured in accordance with an embodiment of the present disclosure.

FIG. 1 provides a top-level view 100 of a computing platform 120 configured to execute a digital painting application 140 employing a color mixing system 150, in accordance with an embodiment of the present disclosure. The user/artist 110 interacts with the computing platform 120 through a user interface 130 which may include one or more of a display element, mouse, keyboard, digital pen or stylus, touch screen, or any other suitable device to facilitate drawing operations by the user.

Figure 2:
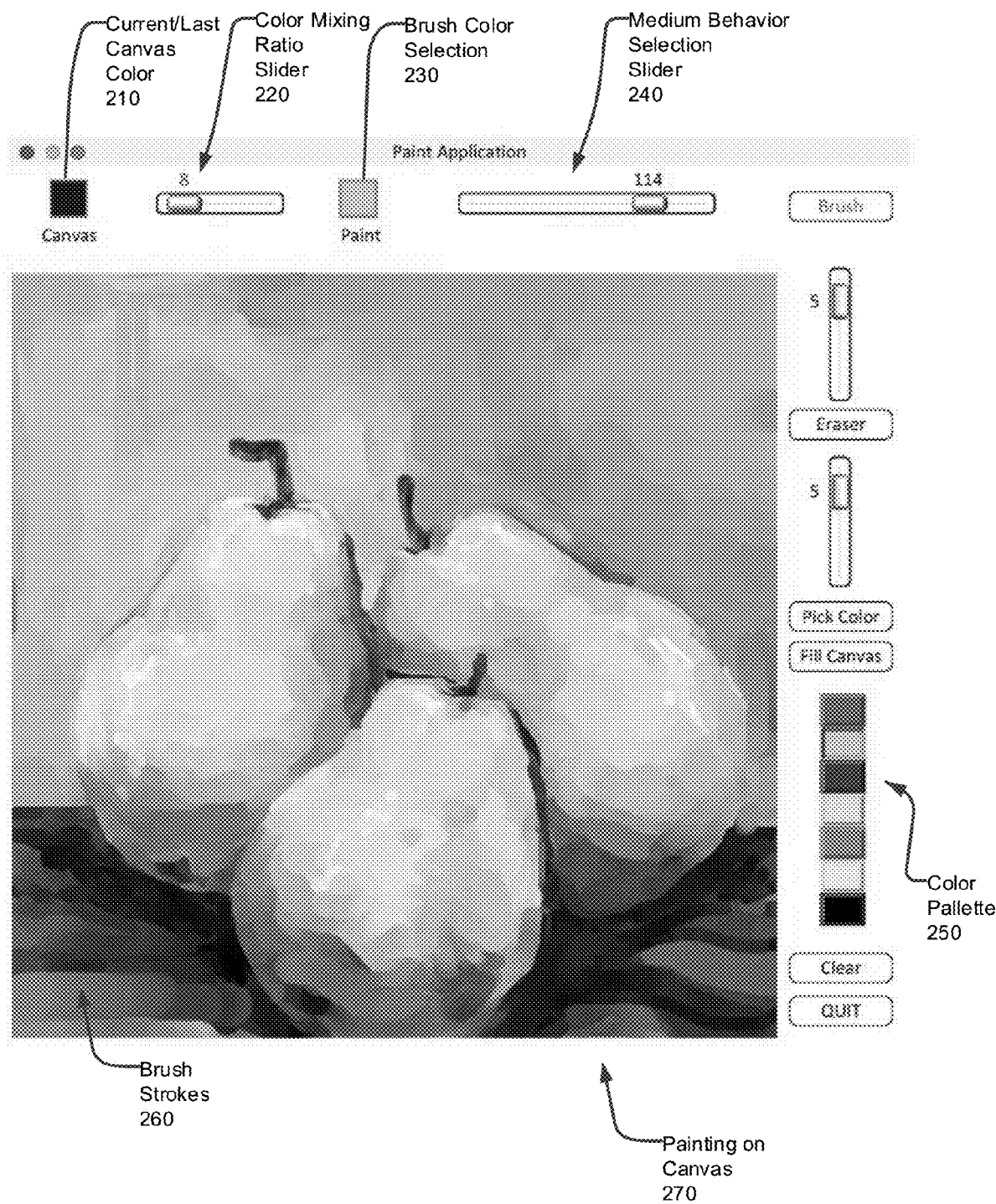
FIG. 2 illustrates a graphical user interface (GUI) for a digital painting application with a color mixing system, configured in accordance with an embodiment of the present disclosure.

FIG. 2 illustrates a graphical user interface (GUI) 200 for a digital painting application with a color mixing system, configured in accordance with an embodiment of the present disclosure. In some embodiments, the GUI 200 is presented by painting application 140, and the user 110 may interact with the GUI 200 through user interface 130.

The GUI 200 provides an area on the screen to display the painting on a canvas or background 270 on which the user works, for example by applying brush strokes 260 with a suitable tool such as a mouse, pen or stylus which provides the functionality of a digital paintbrush. A color palette 250 allows the user to select paint colors for both the canvas and the paintbrush. A limited selection of seven colors is shown in FIG. 2 for simplicity, but it will be appreciated that any number of colors may be provided in the palette. Indicators 210 shows the current or last canvas color that was sampled during the application of a brush stroke. Indicator 230 shows the current selected brush color. Slider bars 220 and 240 are also provided to allow the user to select the color mixing ratio parameter and the paint medium properties (behavior), respectively, as numerical values, which will be explained in greater detail below.

As each brushstroke is applied to the canvas, a color is generated for the application of that brushstroke using the disclosed techniques, based on a mixing of the color of the paint on the brush with the color of the paint on the canvas, at the point where the brush is applied to the canvas.

Various other buttons and controls may be provided in the GUI 200 as desired, such as, for example a brush width selector, an eraser width selector, a fill canvas with selected color button, and a clear painting button.

For instance, in an example use case, the user first clears the canvas to begin work on a new painting. The user may then select a background fill color as a starting point to cover the entire canvas. The user may then select a paintbrush tool and apply a desired color to the brush. The selected color on the paintbrush tool is mixed with the color on the canvas as brushstrokes are applied. The mixing is controlled by the color mixing ratio parameter and the medium selection parameter. In some embodiments, the user may dynamically change these parameters, for example on every brushstroke, or they may remain constant throughout the painting session. As subsequent brushstrokes are applied over earlier brushstrokes, the existing color on the canvas will be the result of a previous color mixing, and a new color mixing will be performed between the existing color on the canvas and the current color on the paintbrush.

In some embodiments, the canvas and the brush tool may keep track of their own amount of paint, through any suitable mechanism, and thus the color mixing ratio parameter may be computed for the user.

In more detail, according to an embodiment, a methodology implementing the techniques for parametric color mixing in a digital painting application, includes generating a Bezier curve extending from a first point in a 3D RGB space to a second point in that space. The first and second points are specified by coordinates based on RGB values of first and second mixing colors, respectively. The first mixing color may be associated with paint on the canvas and the second mixing color may be associated with paint on the brush tool, or vice versa. The Bezier curve is defined by these mixing color endpoints and by a provided curvature parameter which relates to mixing properties of the paint medium (e.g., oil, water colors, pastels, etc.). The curvature parameter also specifies whether additive or subtractive mixing is to be performed (e.g., based on the sign of the parameter). The method also includes locating a point on the Bezier curve that is determined by a provided color mixing ratio parameter which specifies a ratio of the first mixing color to the second mixing color (e.g., the quantity of paint on the canvas versus the quantity of paint on the brush). The method further includes generating a color mix based on RGB values specified by the coordinates of the located point in RGB space on the Bezier curve.

Thus, the foregoing framework provides a system and methodology for parametric color mixing. Numerous example configurations and variations will be apparent in light of this disclosure.

System Architecture

Figure 3:
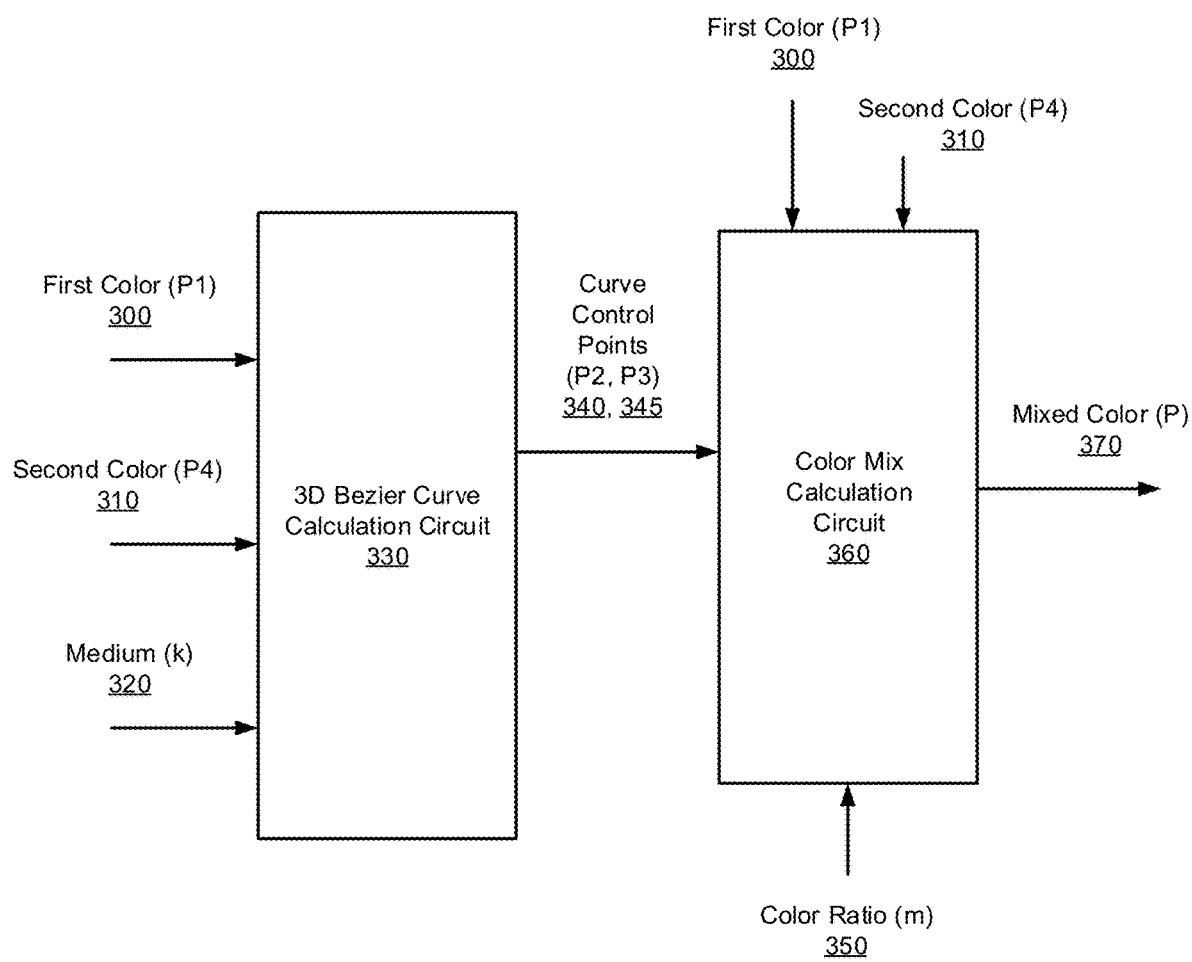
FIG. 3 is a block diagram of a color mixing system, configured in accordance with an embodiment of the present disclosure.

FIG. 3 is a block diagram of a color mixing system 150, configured in accordance with an embodiment of the present disclosure. The color mixing system 150 is shown to include a 3D Bezier curve calculation circuit 330 and a color mix calculation circuit 360.

The 3D Bezier curve calculation circuit 330 is configured to generate a Bezier curve extending from a first point in a 3D RGB space to a second point in the 3D RGB space. The first point is specified by coordinates based on RGB values of a first mixing color (P1) 300. The second point is specified by coordinates based on RGB values of a second mixing color (P4) 310. The Bezier curve is defined by a normalized curvature parameter 320 (designated k, ranging from −1.0 to +1.0) which is associated with the painting medium and the mixing method (e.g., whether additive or subtractive). The process for generating the Bezier curve is described in greater detail below, in connection with FIG. 4, but at this point it suffices to say that the 3D Bezier curve calculation circuit 330 generates curve control points P2 340 and P3 345 which are provided to color mix calculation circuit 360.

The color mix calculation circuit 360 is configured to locate a point P 370 on the Bezier curve which specifies the desired color mix. The Bezier curve is defined by endpoints P1 300 and P4 310, and by curve control points P2 340 and P3 345 (provided by 3D Bezier curve calculation circuit 330). The location of the point is determined by a normalized color mixing ratio parameter 350 (designated m, ranging from 0.0 to +1.0) which specifies a ratio of the first mixing color to the second mixing color. The m parameter may also be considered to be a blending, opacity, or mixing coefficient. For example, a value of m close to zero generates a mixing color close to the canvas color, while a value of m close to one generates a mixing color close to the brush color. The desired color mix is generated as the RGB values specified by coordinates of the located point on the Bezier curve. In some embodiments, the color mix generation may be calculated by the following equation:

$$P=(1-m)^3 P_1+3(1-m)m^2 P_2+3(1-m)m^2 P_3+m^3 P_4; \text{ for each R,G,B coordinate}$$

Figure 4:
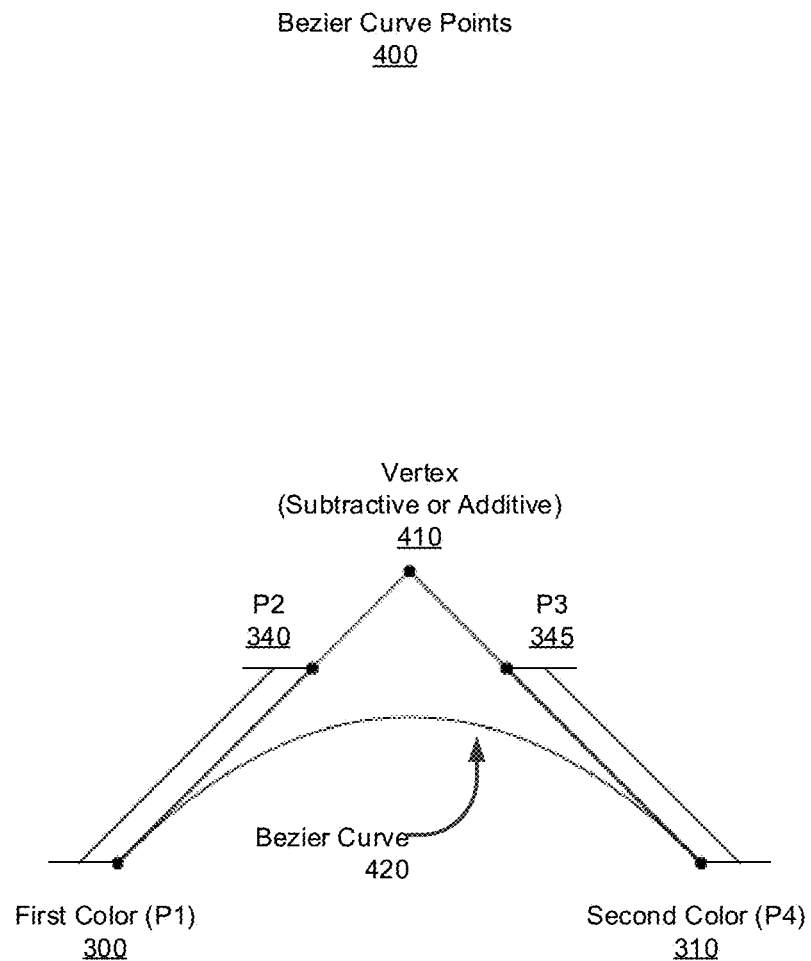
FIG. 4 illustrates a Bezier curve, in accordance with an embodiment of the present disclosure.

FIG. 4 illustrates the defining points 400 of a Bezier curve, in accordance with an embodiment of the present disclosure. A Bezier curve 420, as shown, is defined by endpoints P1 300 and P4 310, and by curvature control points P2 340 and P3 345. In some embodiments, control points P2 and P3 may be calculated by the following equations:

$$P_2=(P_1 \text{ abs}(k)*(\text{vertex}-P_1))$$

$$P_3=(P_4+\text{abs}(k)*(\text{vertex}-P_4))$$

where k is the curvature parameter 320, and vertex is the point of a triangle formed by pure subtractive or additive paths (e.g., straight line segments as shown). The vertex corresponds to pure subtractive or additive mixing of the two colors P1 and P4. The subtractive path is computed by multiplying the RGB components of P1 by the RGB components of P4, while the additive path is computed by summing the RGB components of P1 with the RGB components of P4. The triangular vertex is located at the center of that path. A positive curvature (k) indicates a subtractive path, while a negative curvature (k) indicates an additive path.

Figure 5:
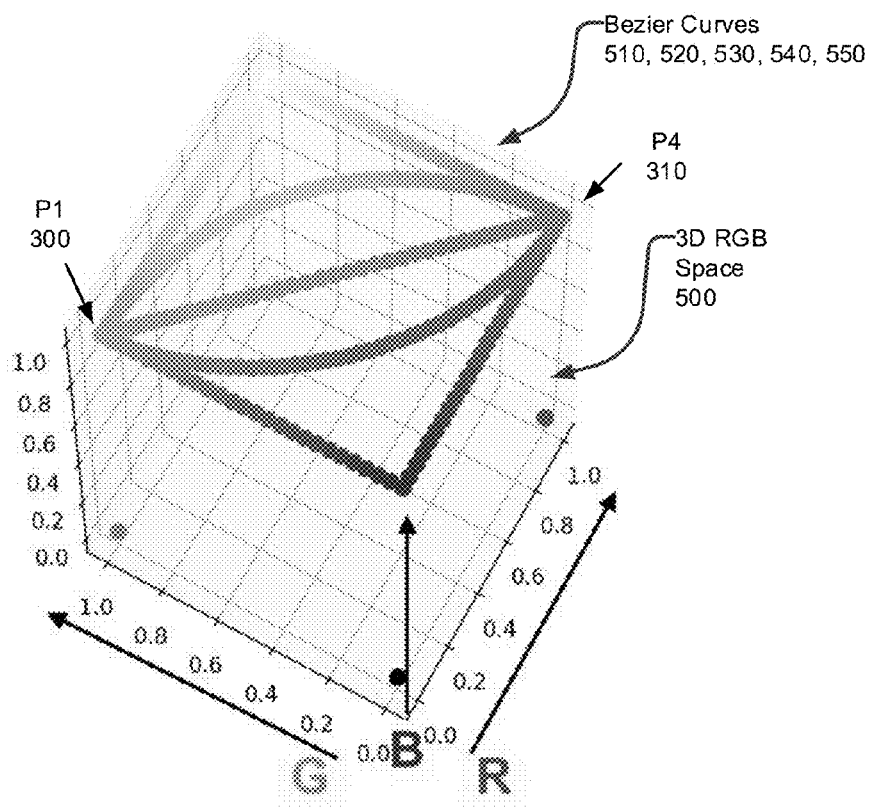
FIG. 5 illustrates a family of Bezier curves associated with a first set of mixing colors, in accordance with an embodiment of the present disclosure.
Figure 5:
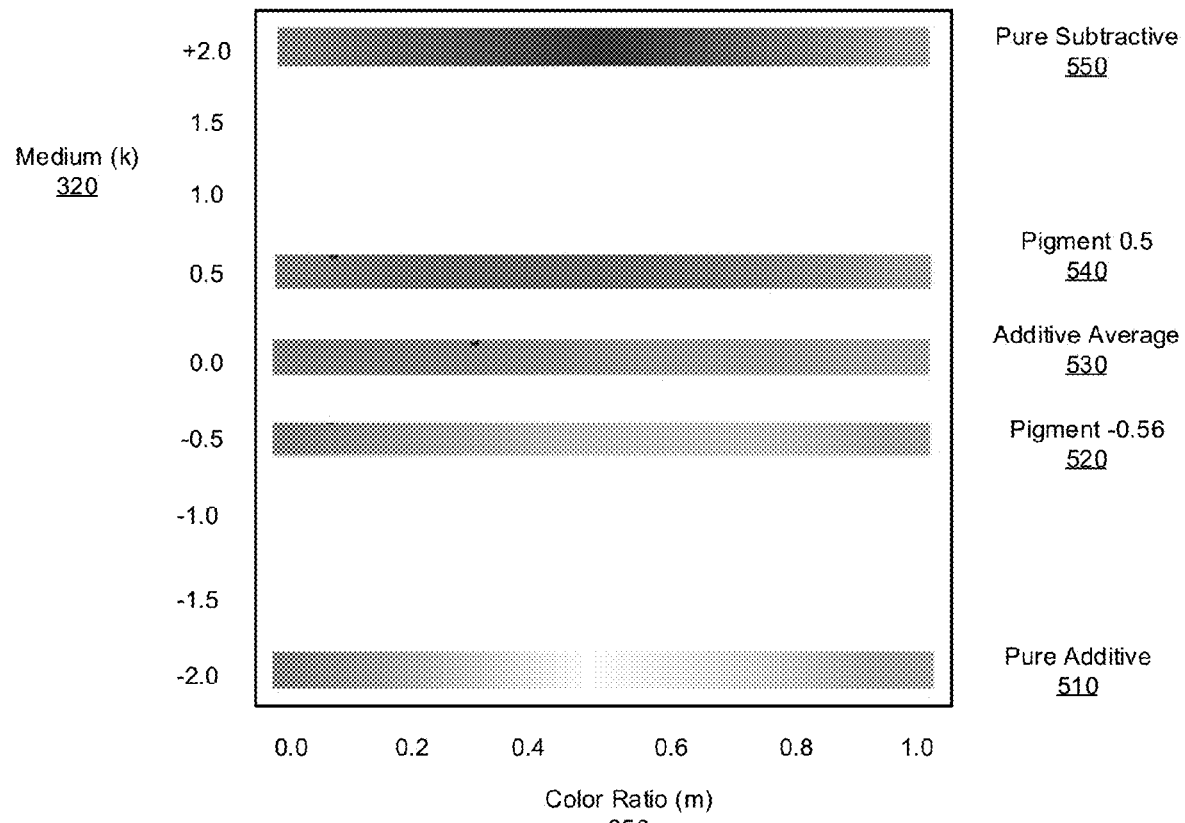

FIG. 5 illustrates a family of Bezier curves 510-550 associated with a first set of mixing colors, in accordance with an embodiment of the present disclosure. The Bezier curves are shown in a 3D RGB space 500.

Bezier curve 550 illustrates a pure subtractive mixing associated with a k value of +2.0 (k values in this and subsequent figures are not normalized). Bezier curve 540 illustrates a mixing associated with a k value (or pigment) of +0.5. Bezier curve 530 illustrates a mixing associated with a k value of 0.0, which is a simple additive average of the two mixing colors P1 and P4. Bezier curve 520 illustrates a mixing associated with a k value (or pigment) of −0.56. Bezier curve 510 illustrates a pure additive mixing associated with a k value of −2.0. Any point along one of the Bezier curves may be selected as the color mix by choosing a desired color mixing ratio value (m).

Figure 6:
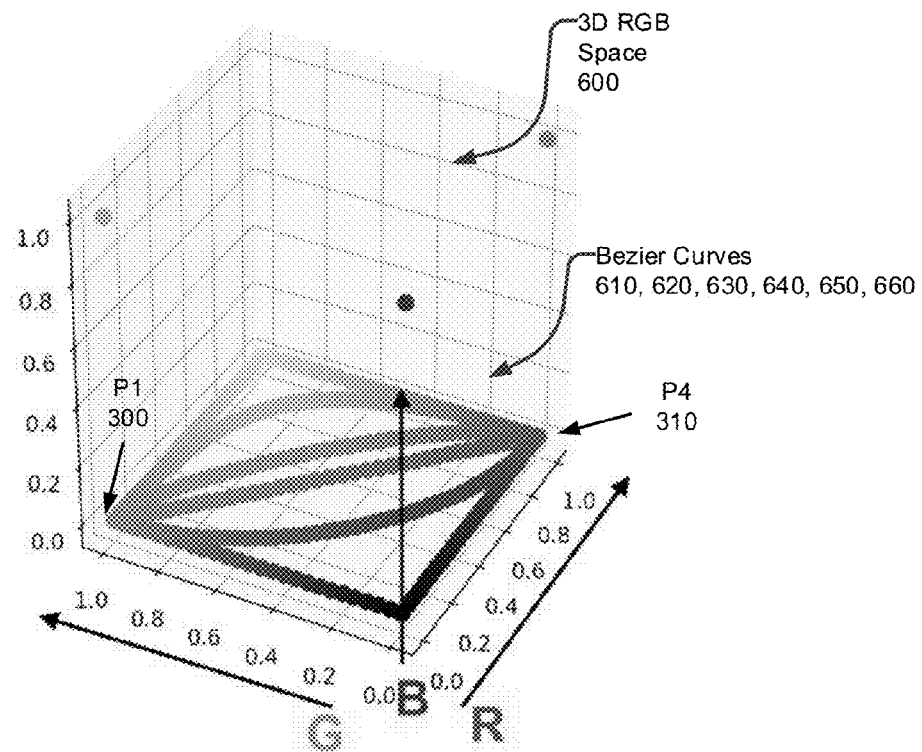
FIG. 6 illustrates a family of Bezier curves associated with a second set of mixing colors, in accordance with an embodiment of the present disclosure.
Figure 6:
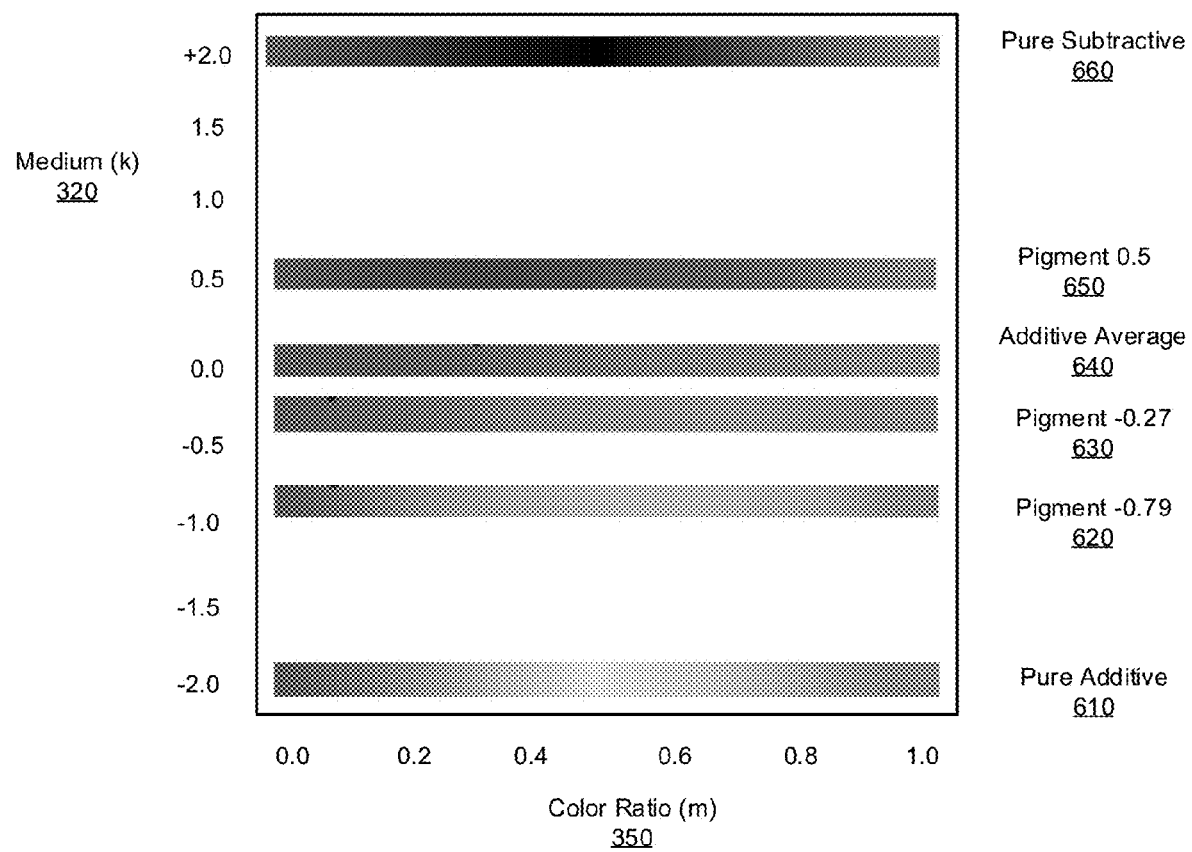

FIG. 6 illustrates a family of Bezier curves 610-660 associated with a second set of mixing colors, in accordance with an embodiment of the present disclosure. The Bezier curves are shown in a 3D RGB space 600.

Bezier curve 660 illustrates a pure subtractive mixing associated with a k value of +2.0. Bezier curve 650 illustrates a mixing associated with a k value (or pigment) of +0.5. Bezier curve 640 illustrates a mixing associated with a k value of 0.0, which is a simple additive average of the two mixing colors P1 and P4. Bezier curve 630 illustrates a mixing associated with a k value (or pigment) of −0.27. Bezier curve 620 illustrates a mixing associated with a k value (or pigment) of −0.79. Bezier curve 610 illustrates a pure additive mixing associated with a k value of −2.0. Any point along one of the Bezier curves may be selected as the color mix by choosing a desired color mixing ratio value (m).

Figure 7:
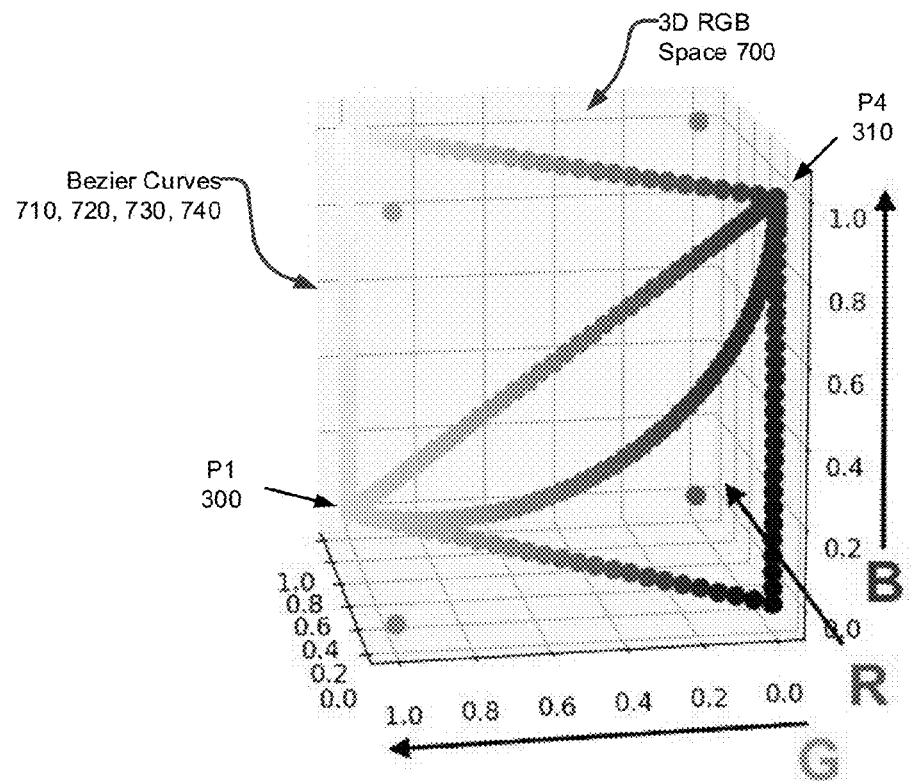
FIG. 7 illustrates a family of Bezier curves associated with a third set of mixing colors, in accordance with an embodiment of the present disclosure.
Figure 7:
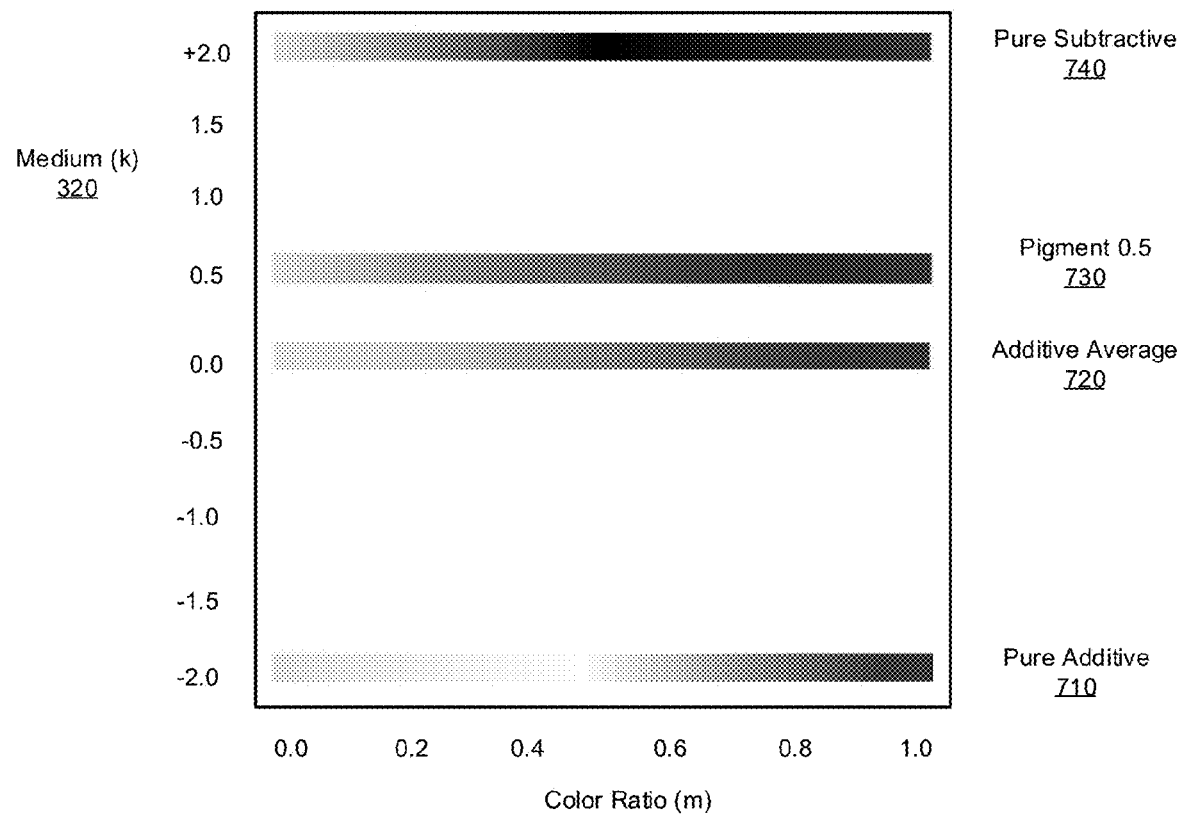

FIG. 7 illustrates a family of Bezier curves 710-740 associated with a third set of mixing colors, in accordance with an embodiment of the present disclosure. The Bezier curves are shown in a 3D RGB space 700.

Bezier curve 740 illustrates a pure subtractive mixing associated with a k value of +2.0. Bezier curve 730 illustrates a mixing associated with a k value (or pigment) of +0.5. Bezier curve 720 illustrates a mixing associated with a k value of 0.0, which is a simple additive average of the two mixing colors P1 and P4. Bezier curve 710 illustrates a pure additive mixing associated with a k value of −2.0. Any point along one of the Bezier curves may be selected as the color mix by choosing a desired color mixing ratio value (m).

Methodology

Figure 8:
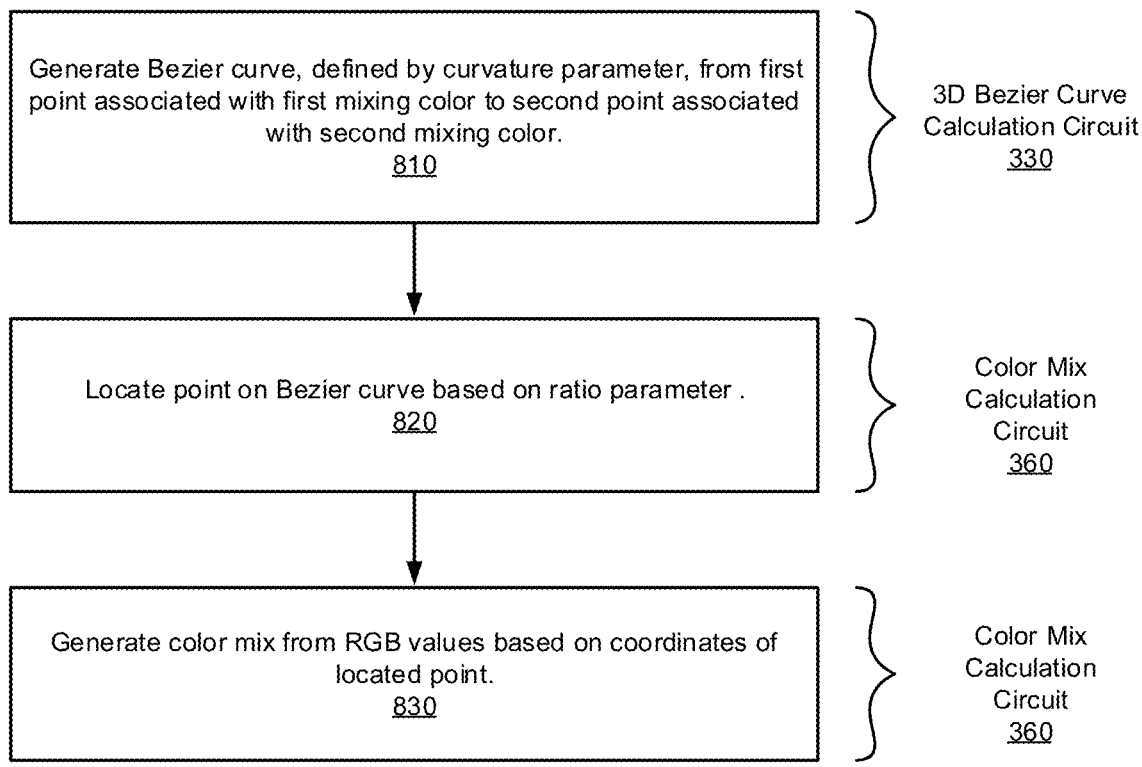
FIG. 8 is a flowchart illustrating a method for parametric color mixing, in accordance with an embodiment of the present disclosure.

FIG. 8 is a flowchart 800 illustrating a method for parametric color mixing, in accordance with an embodiment of the present disclosure. As can be seen, the method is described with reference to the configuration of color mixing system 150 of FIG. 3. However, any number of module configurations can be used to implement the method, as will be appreciated in light of this disclosure. Further note that the various functions depicted in the method do not need to be assigned to the specific example modules or circuits shown. To this end, the example methodology depicted is provided to give one example embodiment and is not intended to limit the methodology to any particular physical or structural configuration.

The method commences, at operation 810, by generating a Bezier curve extending from a first point in a 3D space, to a second point in the 3D space. The first point is specified by coordinates based on RGB values of a first mixing color. The second point is specified by coordinates based on RGB values of a second mixing color. The Bezier curve is defined by a curvature parameter provided by the user and may be generated using the formula described previously. In some embodiments, the first mixing color is associated with paint on a canvas, the second mixing color is associated with paint on a brush tool, and the curvature parameter is associated with a painting medium (e.g., oil color, water color, pastel, etc.). The sign of the curvature parameter determines whether the color mixing is additive (negative sign) or subtractive (positive sign).

The method continues, at operation 820, by locating a point on the Bezier curve that is determined by a user provided color mixing ratio parameter. The mixing ratio parameter specifies a ratio of the first mixing color to the second mixing color. In some embodiments, this may correspond to the amount of paint on the brush relative to the amount of paint on the canvas.

At operation 830, a color mix of the first and second mixing colors is generated based on RGB values specified by the coordinates of the located point on the Bezier curve, as previously described.

In some embodiments, additional operations are performed. For example, in one embodiment, predetermined curvature values, corresponding to various preselected painting mediums, may be provided for the user's selection. In such case, the user may make a selection of "oil" or "watercolor" from a pull down menu, or other suitable mechanism, and the system will supply the appropriate curvature parameter value. In some embodiments, the system may allow the user to dynamically update the curvature and/or color mixing ratio parameters, for example on every stroke of the paint brush.

Example Platform

Figure 9:
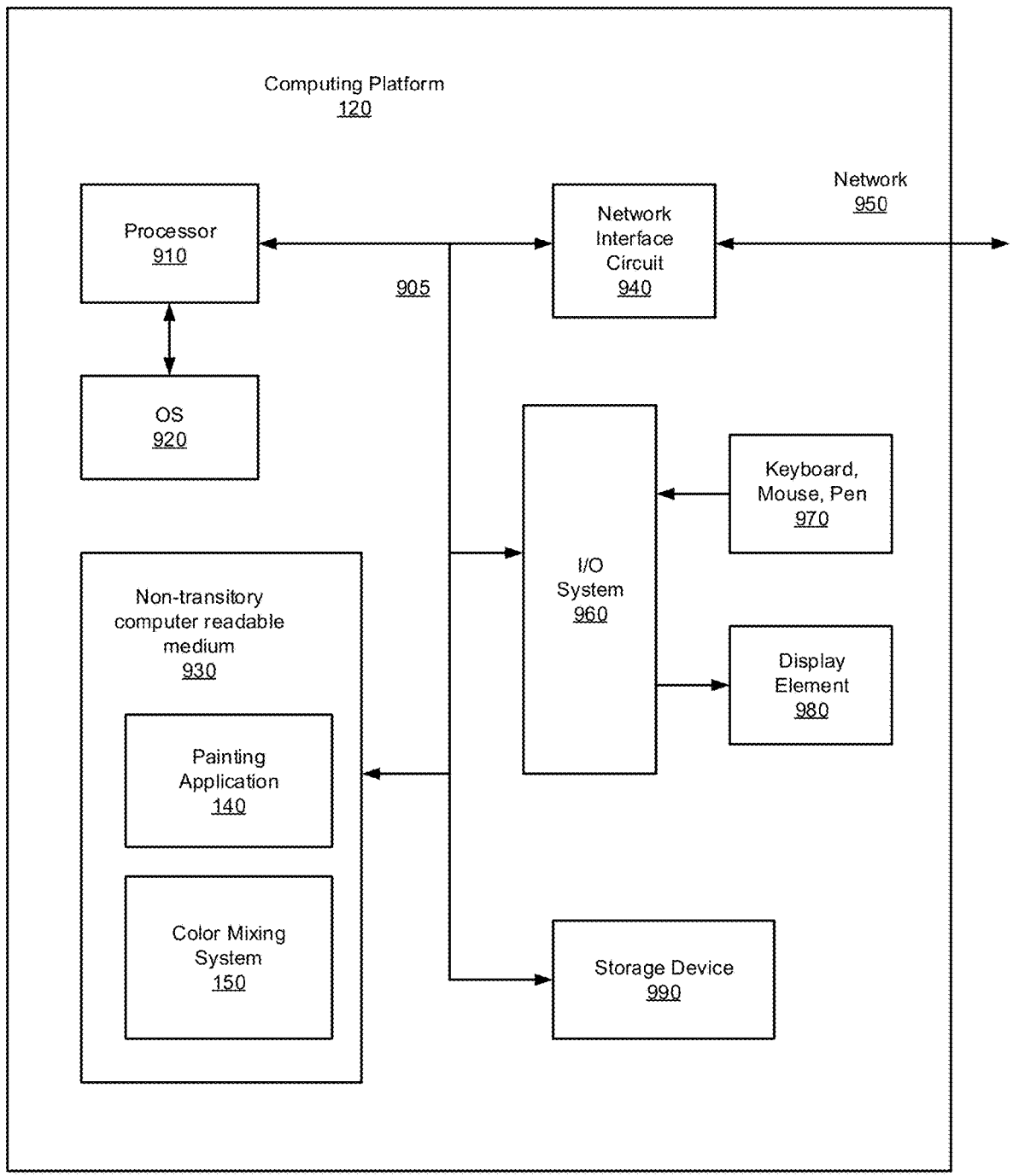
FIG. 9 is a block diagram schematically illustrating a computing platform configured to perform any of the techniques as variously described in this disclosure, configured in accordance with an embodiment of the present disclosure.

FIG. 9 is a block diagram schematically illustrating a computing platform 120 configured to perform any of the techniques as variously described in this disclosure, configured in accordance with an embodiment of the present disclosure. For example, in some embodiments, the color mixing system 150 of FIG. 3, or any portions thereof, and the methodologies of FIG. 8, or any portions thereof, are implemented in the computing platform 120. In some embodiments, the computing platform 120 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing platform 120 includes one or more storage devices 990 and/or non-transitory computer-readable media 930 having encoded thereon one or more computer-executable instructions or software for implementing techniques as variously described in this disclosure. In some embodiments, the storage devices 990 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 990 includes other types of memory as well, or combinations thereof. In one embodiment, the storage device 990 is provided on the computing platform 120. In another embodiment, the storage device 990 is provided separately or remotely from the computing platform 120. The non-transitory computer-readable media 930 include, but are not limited to, one or more types of hardware memory, non-transitory tangible media (for example, one or more magnetic storage disks, one or more optical disks, one or more USB flash drives), and the like. In some embodiments, the non-transitory computer-readable media 930 included in the computing platform 120 store computer-readable and computer-executable instructions or software for implementing various embodiments. In one embodiment, the computer-readable media 930 are provided on the computing platform 120. In another embodiment, the computer-readable media 930 are provided separately or remotely from the computing platform 120.

The computing platform 120 also includes at least one processor 910 for executing computer-readable and computer-executable instructions or software stored in the storage device 990 and/or non-transitory computer-readable media 930 and other programs for controlling system hardware. In some embodiments, virtualization is employed in the computing platform 120 so that infrastructure and resources in the computing platform 120 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 905 is also provided to allow for communication between the various components listed above and/or other components not shown. Computing platform 120 can be coupled to a network 950 (e.g., a local or wide area network such as the internet), through network interface circuit 940 to allow for communications with other computing devices, platforms, resources, clients, and Internet of Things (IoT) devices.

In some embodiments, a user interacts with the computing platform 120 through an input/output system 960 that interfaces with devices such as a keyboard, mouse, pen or stylus 970 and/or a display element (screen/monitor) 980. The keyboard, mouse, and pen/stylus may be configured to provide a user interface to accept user input and guidance, for example to operate controls on a digital painting application GUI, control a digital paintbrush, select images, paintings, canvas backgrounds, and to otherwise control the painting and color mixing processes described herein. The display element may be configured, for example, to display the painting results including the mixed colors generated using the disclosed techniques. In some embodiments, the computing platform 120 includes other I/O devices (not shown) for receiving input from a user, for example, a pointing device or a touchpad, etc., or any suitable user interface. In some embodiments, the computing platform 120 includes other suitable conventional I/O peripherals. The computing platform 120 can include and/or be operatively coupled to various suitable devices for performing one or more of the aspects as variously described in this disclosure.

In some embodiments, the computing platform 120 runs an operating system (OS) 920, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 120 and performing the operations described in this disclosure. In one embodiment, the operating system runs on one or more cloud machine instances.

As will be appreciated in light of this disclosure, the various modules and components of the system, as shown in FIGS. 1 and 7-10, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 120, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a method for parametric color mixing, the method comprising: generating, by a processor-based system, a Bezier curve extending from a first point in a 3-Dimensional (3D) space, to a second point in the 3D space, the first point specified by coordinates based on red-green-blue (RGB) values of a first mixing color, the second point specified by coordinates based on RGB values of a second mixing color, the Bezier curve defined by a curvature parameter; locating, by the processor based system, a point on the Bezier curve, the location of the point determined by a color mixing ratio parameter specifying a ratio of the first mixing color to the second mixing color; and generating, by the processor-based system, a color mix based on RGB values specified by coordinates of the located point on the Bezier curve.

Example 2 includes the subject matter of Example 1, wherein the first mixing color is associated with paint on a canvas and the second mixing color is associated with paint on a brush tool.

Example 3 includes the subject matter of Examples 1 or 2, wherein the curvature parameter is associated with a painting medium.

Example 4 includes the subject matter of any of Examples 1-3, further comprising providing curvature parameters, the curvature parameters associated with painting media, including at least one of oil color, water color, and pastel.

Example 5 includes the subject matter of any of Examples 1-4, wherein a sign of the curvature parameter determines additive mixing or subtractive mixing.

Example 6 includes the subject matter of any of Examples 1-5, wherein the color mixing ratio parameter is associated with a quantity of paint on a brush tool and a quantity of paint on a canvas.

Example 7 includes the subject matter of any of Examples 1-6, further comprising accepting updates of the curvature parameter and/or the color mixing ratio parameter for each of a plurality of brush strokes.

Example 8 is a system for parametric color mixing, the system comprising: one or more processors configured to generate a Bezier curve extending from a first point in a 3-Dimensional (3D) space, to a second point in the 3D space, the first point specified by coordinates based on red-green-blue (RGB) values of a first mixing color, the second point specified by coordinates based on RGB values of a second mixing color, the Bezier curve defined by a curvature parameter; the one or more processors further configured to locate a point on the Bezier curve, the location of the point determined by a color mixing ratio parameter specifying a ratio of the first mixing color to the second mixing color; and the one or more processors further configured to generate a color mix based on RGB values specified by coordinates of the located point on the Bezier curve.

Example 9 includes the subject matter of Example 8, wherein the first mixing color is associated with paint on a canvas and the second mixing color is associated with paint on a brush tool.

Example 10 includes the subject matter of Examples 8 or 9, wherein the curvature parameter is associated with a painting medium.

Example 11 includes the subject matter of any of Examples 8-10, the one or more processors further configured to provide curvature parameters, the curvature parameters associated with painting media, including at least one of oil color, water color, and pastel.

Example 12 includes the subject matter of any of Examples 8-11, wherein a sign of the curvature parameter determines additive mixing or subtractive mixing.

Example 13 includes the subject matter of any of Examples 8-12, wherein the color mixing ratio parameter is associated with a quantity of paint on a brush tool and a quantity of paint on a canvas.

Example 14 includes the subject matter of any of Examples 8-13, the one or more processors further configured to accept updates of the curvature parameter and/or the color mixing ratio parameter for each of a plurality of brush strokes.

Example 15 is a computer program product including one or more non-transitory machine-readable mediums encoded with instructions that when executed by one or more processors cause a process to be carried out for parametric color mixing, the process comprising: generating a Bezier curve extending from a first point in a 3-Dimensional (3D) space, to a second point in the 3D space, the first point specified by coordinates based on red-green-blue (RGB) values of a first mixing color, the second point specified by coordinates based on RGB values of a second mixing color, the Bezier curve defined by a curvature parameter; locating a point on the Bezier curve, the location of the point determined by a color mixing ratio parameter specifying a ratio of the first mixing color to the second mixing color; and generating a color mix based on RGB values specified by coordinates of the located point on the Bezier curve.

Example 16 includes the subject matter of Example 15, wherein the first mixing color is associated with paint on a canvas and the second mixing color is associated with paint on a brush tool.

Example 17 includes the subject matter of Examples 15 or 16, the wherein the curvature parameter is associated with a painting medium.

Example 18 includes the subject matter of any of Examples 15-17, further comprising providing curvature parameters, the curvature parameters associated with painting media, including at least one of oil color, water color, and pastel.

Example 19 includes the subject matter of any of Examples 15-18, wherein a sign of the curvature parameter determines additive mixing or subtractive mixing.

Example 20 includes the subject matter of any of Examples 15-19, further comprising accepting updates of the curvature parameter and/or the color mixing ratio parameter for each of a plurality of brush strokes.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A method for parametric color mixing, the method comprising:
    generating, by a processor-based system, a Bezier curve extending from a first point in a 3-Dimensional (3D) space, to a second point in the 3D space, the first point specified by coordinates based on red-green-blue (RGB) values of a first mixing color, the second point specified by coordinates based on RGB values of a second mixing color, the Bezier curve defined by a curvature parameter;
    locating, by the processor based system, a point on the Bezier curve, the location of the point determined by a color mixing ratio parameter specifying a ratio of the first mixing color to the second mixing color; and
    generating, by the processor-based system, a color mix based on RGB values specified by coordinates of the located point on the Bezier curve.

2. The method of claim 1, wherein the first mixing color is associated with paint on a canvas and the second mixing color is associated with paint on a brush tool.

3. The method of claim 1, wherein the curvature parameter is associated with a painting medium.

4. The method of claim 3, further comprising providing curvature parameters, the curvature parameters associated with painting media, including at least one of oil color, water color, and pastel.

5. The method of claim 1, wherein a sign of the curvature parameter determines additive mixing or subtractive mixing.

6. The method of claim 1, wherein the color mixing ratio parameter is associated with a quantity of paint on a brush tool and a quantity of paint on a canvas.

7. The method of claim 1, further comprising accepting updates of the curvature parameter and/or the color mixing ratio parameter for each of a plurality of brush strokes.

8. A system for parametric color mixing, the system comprising:
    one or more processors configured to generate a Bezier curve extending from a first point in a 3-Dimensional (3D) space, to a second point in the 3D space, the first point specified by coordinates based on red-green-blue (RGB) values of a first mixing color, the second point specified by coordinates based on RGB values of a second mixing color, the Bezier curve defined by a curvature parameter;
    the one or more processors further configured to locate a point on the Bezier curve, the location of the point determined by a color mixing ratio parameter specifying a ratio of the first mixing color to the second mixing color; and
    the one or more processors further configured to generate a color mix based on RGB values specified by coordinates of the located point on the Bezier curve.

9. The system of claim 8, wherein the first mixing color is associated with paint on a canvas and the second mixing color is associated with paint on a brush tool.

10. The system of claim 8, wherein the curvature parameter is associated with a painting medium.

11. The system of claim 10, the one or more processors further configured to provide curvature parameters, the curvature parameters associated with painting media, including at least one of oil color, water color, and pastel.

12. The system of claim 8, wherein a sign of the curvature parameter determines additive mixing or subtractive mixing.

13. The system of claim 8, wherein the color mixing ratio parameter is associated with a quantity of paint on a brush tool and a quantity of paint on a canvas.

14. The system of claim 8, the one or more processors further configured to accept updates of the curvature parameter and/or the color mixing ratio parameter for each of a plurality of brush strokes.

15. A computer program product including one or more non-transitory machine-readable mediums encoded with instructions that when executed by one or more processors cause a process to be carried out for parametric color mixing, the process comprising:

generating a Bezier curve extending from a first point in a 3-Dimensional (3D) space, to a second point in the 3D space, the first point specified by coordinates based on red-green-blue (RGB) values of a first mixing color, the second point specified by coordinates based on RGB values of a second mixing color, the Bezier curve defined by a curvature parameter;

locating a point on the Bezier curve, the location of the point determined by a color mixing ratio parameter specifying a ratio of the first mixing color to the second mixing color; and generating a color mix based on RGB values specified by coordinates of the located point on the Bezier curve.

16. The computer program product of claim 15, wherein the first mixing color is associated with paint on a canvas and the second mixing color is associated with paint on a brush tool.

17. The computer program product of claim 15, wherein the curvature parameter is associated with a painting medium.

18. The computer program product of claim 17, further comprising providing curvature parameters, the curvature parameters associated with painting media, including at least one of oil color, water color, and pastel.

19. The computer program product of claim 15, wherein a sign of the curvature parameter determines additive mixing or subtractive mixing.

20. The computer program product of claim 15, further comprising accepting updates of the curvature parameter and/or the color mixing ratio parameter for each of a plurality of brush strokes.

\* \* \* \* \*